Figure 1:
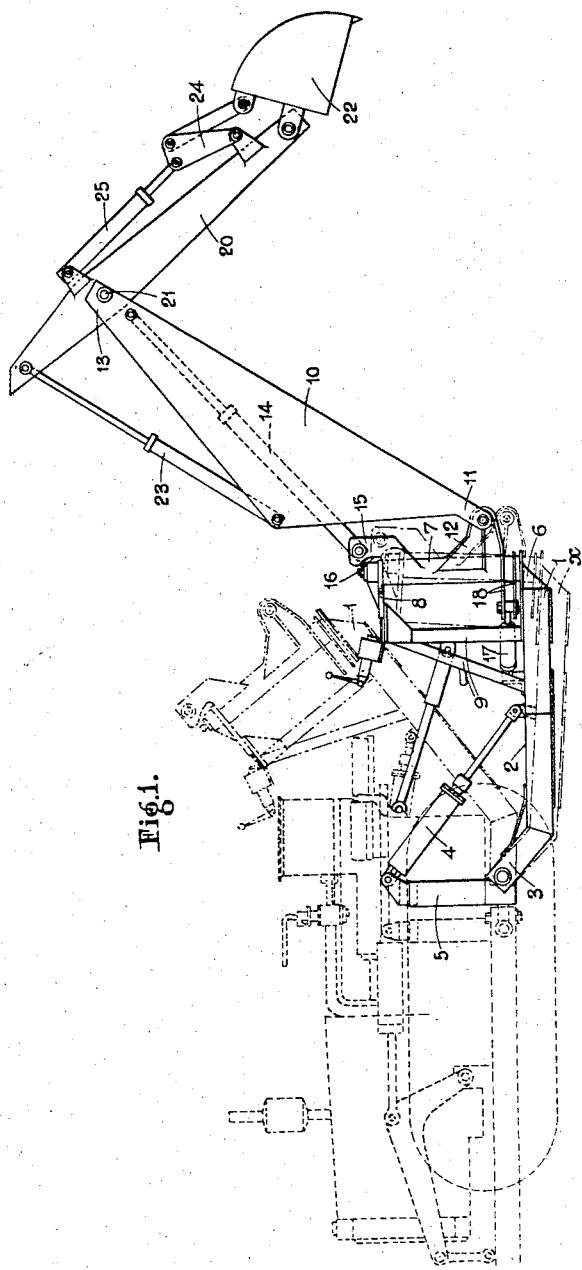

April 7, 1959     M. P. WALKER     2,880,894
SOIL EXCAVATING APPARATUS

Filed Oct. 7, 1957     2 Sheets-Sheet 2

INVENTOR
MATTHEW P. WALKER

United States Patent Office 2,880,894
Patented Apr. 7, 1959

2,880,894

SOIL EXCAVATING APPARATUS

Matthew Paton Walker, Hounslow, Middlesex, England

Application October 7, 1957, Serial No. 688,638

4 Claims. (Cl. 214—138)

This invention relates to soil excavating apparatus of the type including a boom pivoted to a supporting structure mounted on or adapted to be mounted on a tractor so as to be raised and lowered by a hydraulically operated boom ram about a substantially horizontal axis, and carrying at its outer end a dipper arm pivoted on the boom for movement through the medium of a dipper arm, said dipper arm supporting a scoop tiltably mounted at the arm's outer end and adapted to be tilted with respect to the dipper arm by another hydraulic ram usually referred to as the crowd ram; all the rams have fluid connections adapting them to be powered by pressure fluid supplied from the tractor, and the boom is constructed for slewing on a substantially vertical axis about a king post carried on the aforesaid supporting structure. The foregoing is a known kind of excavator apparatus and no claim is made herein to the same per se; it is hereinafter referred to as "the type described."

The present invention has for its primary object to provide a greater range of working area for the scoop for each siting of the tractor in comparison with known excavator apparatus of the type described without interfering with the capability of the apparatus of casting the spoil clear of the excavation.

In this respect a soil excavating apparatus of the type described is characterised in that the supporting structure for the king post and boom comprises a framework having a pair of parallel arms adapted to lie respectively on each side of a tractor and each furnished with means at one end for pivotal attachment to the base of the chassis or other fixed structure of the tractor said arms carrying a V framework spanning their free ends apex outwards with the king post and the boom axes located at or about the said apex, so enabling the apparatus to be used with the framework in a substantially horizontal plane with its apex projecting over an excavation area.

By the foregoing construction the axes of the king post and boom can be so disposed that the scoop may for a siting of the apparatus excavate over an appreciably larger area than is possible with the previously known types of apparatus.

In addition (as rendered possible by such a construction) the angle of slew can be increased from the usual angle of about 90° each side of the longitudinal centre line of the tractor, to approximately 120° each side of the centre line, means being provided, if desired, to enable any one of a suitable number of sectors smaller than the total slew of 240° set out at predetermined positions within the 240° range to be selected for excavation and so as to limit the slewing movement of the apparatus according to the sector chosen. For instance, if a slewing angle of 120° is considered to be a good working angle, then such a sector can be selected at any of a number (say three or four) of different pre-set positions within the confines of the 240° arc.

Figure 2:
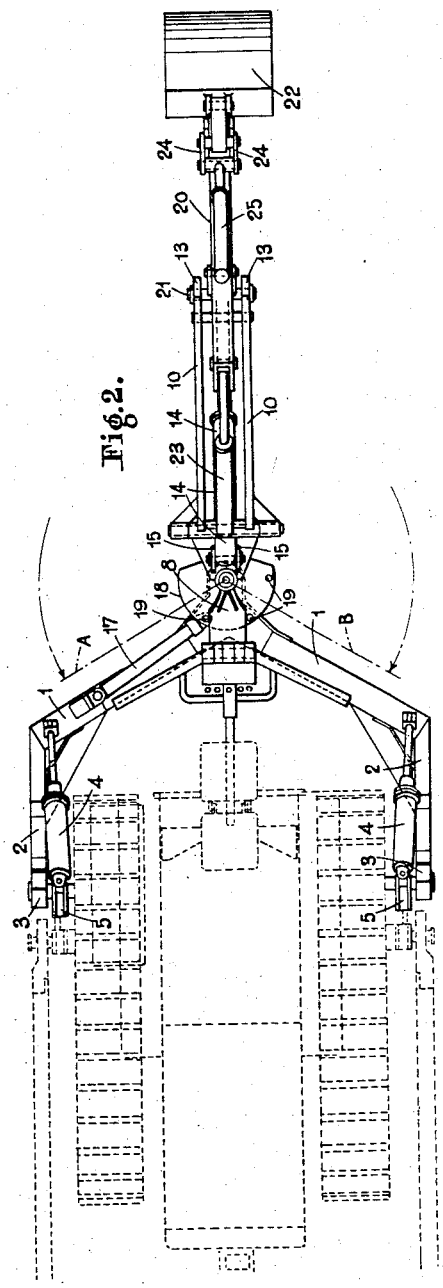

In order that the said invention may be readily understood an embodiment thereof will be described by way of example with the aid of the accompanying drawings wherein:

Figure 1 is a side view, and
Figure 2 is a plan.

The illustrations show the excavating apparatus in full lines attached to a bull-dozing tractor depicted in broken (dash) lines with alternative position of the excavating apparatus depicted in dot-and-dash lines.

The excavating apparatus includes a supporting structure in the form of a yoke which is adapted to be pivoted to the rear of a tractor near the base of the chassis framework thereof or to any other convenient fixed structure. This yoke takes the form of a substantially V-shaped framework 1 lying apex outwards away from the point of attachment to the tractor of a pair of parallel arms 2, 2 extending respectively from the tips of the legs of the V 1 and adapted to lie one on each side of the tractor. These arms are furnished with eyed ends 3 adapting them to be pivoted to the tractor, as already stated, so that the yoke may be swung up from a normal working position in the horizontal as in full lines to a raised, out of action position through an angle of approximately 45° as in dot-and-dash lines in Figure 1. The pivotal movement also enables the yoke to be swung downward as indicated at x in Figure 1 to a limited degree and also upward through any requisite small angle to secure that the supporting structure 1, 2 is substantially horizontal even though the tractor may be sited on a slope leading down or up from the area of excavation. The rise and fall of the yoke is brought about by a pair of hydraulic rams 4 extending downwardly from side uprights 5 fixed to the tractor at or about the pivotal axis of the structure 1, 2, and pivotally secured to the structure one at each side at or about the tips of the legs of the V element 1 of the supporting structure.

At the apex of the said V structure 1 there extends outwardly a short bracket 6 on which is erected a king post 7 supported at the top by a horizontal arm 8 projecting forwardly (i.e. away from the tractor and the pivotal ends 3 of the structure 1, 2) from an A-frame 9 or similar structure also erected from the supporting structure 1, 2 further back than the king post, i.e. nearer to the tractor. In the normal working position the king post 7 stands substantially vertically and it is rotatably mounted between the said horizontal arm 8 at the top and the extended bracket 6 from the structure 1, 2 at the bottom in suitable bushings. The king post 7 carries the boom which is conveniently in the form of a pair of parallel triangular plates 10, 10 spaced apart and secured together and pivoted by one of the pairs of angular corners at 11 to a pair of lugs 12 projecting from the king post 7 near the bottom thereof. Thus the boom 10, 10 can be raised and lowered about this horizontal boom pivot at 11 which, in the centralised position of the boom as seen in Figure 2, lies transversely to the longitudinal axis of the tractor. The outer end 13 of the boom (another angular corner of the triangular platework 10) is linked to the king post 7 by the boom ram 14. For this purpose the post 7 is furnished with an upper lug arrangement 15, at or near its top, projecting over the aforesaid lower lugs 6 to which the boom is pivoted. The upper lug arrangement 15 projects outwardly and upwardly with its top above the king post 7 and, so that these lugs 15 will not foul the aforesaid horizontal arm 8 projecting from the A-frame 9 to support the king post, and it is recessed at 16 to permit the utmost limit of slewing.

It will be appreciated that the boom is slewed by rotating the king post 7, and inasmuch as the vertical axis of turning is carried by the tip of the supporting structure 1, 2 well clear of the tractor the boom can be swung backwards towards the tractor through an angle much more than a right-angle on each side of the king post. In fact the arc of slewing can be increased to 240° overall from A to B. The slewing movement is controlled by a slewing ram 17 pivotally mounted by one end on the structure 1, 2 at one side and pivotally mounted by its other end to a quadrant plate 18 fixed to the king post and projecting back at right-angles to the post's axis towards the supporting structure 1, 2. The quadrant plate 18 is formed with a suitable number of anchoring holes 19 (e.g. three) to which the slewing ram 17 may be attached. The stroke of the ram may be such as to bring about a 120° slew and, by selecting an appropriate anchoring hole 19 in the quadrant plate 18, this slewing arc may be positioned at any one of a number (e.g. three) of different parts within the total 240° slewing range of the boom from A to B.

As usual with excavating apparatus of the type described, a dipper arm 20 is mounted on the outer end of the boom 10. This is in the form of a two-armed lever pivoted to the boom at 21 the lever having a long arm carrying the scoop 22 pivoted at the end of the arm and a short arm connected to the boom by a dipper ram 23. The scoop 22 is linked, as usual, to a double-plate 24 pivoted to the top of the dipper arm 20 and controlled by a crowd ram 25 lying along the dipper arm and mounted between the said double-plate 24 and the arm.

The various rams are connected by flexible piping (not shown) to suitable valve controls on the tractor through which the ram-actuating pressure fluid passes.

I claim:

1. Soil excavating apparatus comprising in combination a supporting structure consisting of a pair of parallel arms for pivotal mounting by one end of each on a tractor about a substantially common horizontal axis, a framework of V form spanning the free ends of the arms with its apex disposed outwards, a pair of uprights adapted to be fixed to the tractor one on each side thereof adjacent to the pivotal mounting of the arms, a pair of elevating hydraulic rams attached respectively to the parallel arms by one of their ends and adapted to be attached to said pair of uprights by their other ends so as to raise and lower the supporting structure, a vertical framework supported by said spanning framework of the supporting structure and adjacent to the apex thereof, a bearing bracket extending outwardly from the apex of the spanning framework and an outwardly extending arm at the top of the vertical framework, a king post mounted for rotation between said bearing bracket and the projecting arm, a slewing ram connected at one end to the supporting structure and at its other end to means connected to the king post, said king post carrying a boom for slewing thereon, a hydraulically operated boom ram fixed by one end to the king post and by its other end to the boom, a dipper arm pivoted intermediate of its length on the outer end of the boom and moved by a dipper ram connected between the boom and one end of the dipper arm, and a scoop tiltably mounted on the other end of the dipper arm and adapted to be tilted by a crown ram.

2. An excavating apparatus according to claim 1, in which the king post is formed with a pair of lower lugs projecting from near the bottom theerof to take a horizontal pivot of the boom, and a pair of upper lugs at or near its top to take the pivot of the boom ram linking the boom to the top of the post.

3. Soil excavating apparatus comprising in combination a supporting structure consisting of a pair of parallel arms for pivotal mounting by one end of each on a tractor about a substantially common horizontal axis, a framework of V form spanning the free ends of the arms with its apex disposed outwards, a pair of uprights adapted to be fixed to the tractor one on each side thereof adjacent to the pivotal mounting of the arms, a pair of elevating hydraulic rams attached respectively to the parallel arms by one of their ends and adapted to be attached to said pair of uprights by their other ends so as to raise and lower the supporting structure, a vertical framework supported by said spanning framework of the supporting structure and adjacent to the apex thereof, a bearing bracket extending outwardly from the apex of the spanning framework and an outwardly extending arm at the top of the vertical framework, a king post mounted for rotation between said bearing bracket and the projecting arm, a slewing ram connected at one end to the supporting structure and at its other end to a quadrant plate fixed to the king post and extending at right angles towards the pivotal axis of the supporting structure, a pair of lower lugs projecting from near the bottom of the king post to take a horizontal pivot of a boom, a pair of upper lugs at or near the top of the king post to take the pivot of a boom ram linking the boom to the top of the post, a dipper arm pivoted intermediate of its length on the outer end of the boom and moved by a dipper ram connected between the boom and one end of the dipper arm, and a scoop tiltably mounted on the other end of the dipper arm and adapted to be tilted by a crown ram.

4. An excavating apparatus according to claim 3, wherein the quadrant plate is formed with a plurality of anchoring holes to one of which the slewing ram may be selectively attached.

References Cited in the file of this patent
UNITED STATES PATENTS

| | | |
|---|---|---|
| 2,634,519 | Merz | Apr. 14, 1953 |
| 2,674,500 | Hukari | Apr. 6, 1954 |
| 2,834,489 | Davis | May 13, 1958 |